United States Patent Office 2,868,326
Patented Jan. 13, 1959

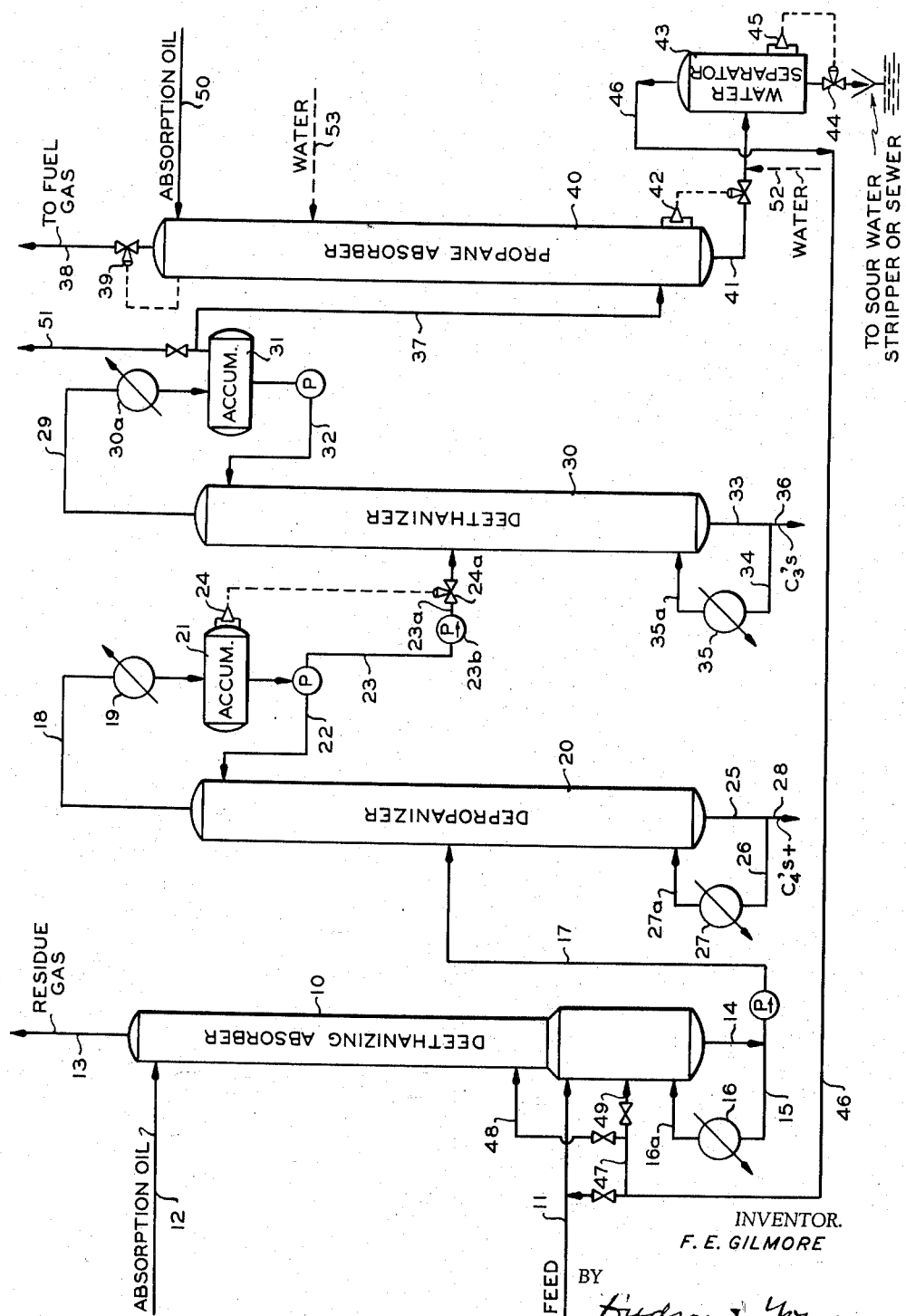

2,868,326

RECOVERY OF HYDROCARBONS FROM GASES

Forrest E. Gilmore, Bartlesville, Okla., assignor to Phillips Petroleum Company, a corporation of Delaware Application March 11, 1957, Serial No. 645,307

9 Claims. (Cl. 183—115)

This invention relates to the recovery of hydrocarbons from gases containing them. In one aspect, the invention is concerned with the recovery of normally gaseous hydrocarbons from a stream containing not only gases suitable for use as fuel gases but also containing hydrocarbons, for example, propane and propylene, which are more desirable for other than fuel purposes, and hydrogen sulfide, or other gaseous impurities, by a combination of fractionation and absorption steps including steps in which the treated gases, resulting from a satisfactory absorption and subsequent fractionation, are again treated by absorption to absorb said gases desirable for other than fuel gas purposes and while said gases are absorbed, washing the rich absorbent containing them with a hydrogen sulfide removing stream to remove hydrogen sulfide therefrom, yielding a fuel gas stream and a rich absorbent stream containing gases desirable for other than fuel gas purposes. In a more specific aspect of the invention, a residue gas is separated from a stream of gases containing hydrogen sulfide and normally gaseous hydrocarbons by use of an absorber oil and, after fractionation of the absorbed gases to remove $C_3$ and $C_4$ hydrocarbons, the $C_2$ and lighter hydrocarbons and hydrogen sulfide-containing stream, which however contains desirable $C_3$ hydrocarbons unavoidably left in said stream for reasons appearing below, is contacted with absorber oil to recover substantially all of said $C_3$ hydrocarbons and hydrogen sulfide to produce a fuel gas low in hydrogen sulfide and quite low in $C_3$ hydrocarbons and a stream of absorber oil rich in $C_3$ hydrocarbons and hydrogen sulfide which is then washed to remove hydrogen sulfide therefrom.

In actual plant operations, a series of towers comprising a deethanizing absorber, a depropanizer, and a deethanizer (the gaseous feed being charged to the deethanizing absorber) are employed for hydrocarbons separation. In operation, it has been found to be difficult or to require a great amount of time and skill on the part of the operators to prevent losses of valuable hydrocarbons (propane and propylene) out of the deethanizing absorber to residue gas or out of the deethanizer to plant fuel gas for the reason that in the deethanizing absorber slight changes in reboiler heat will cause either an undesirable amount of propane and propylene to go overhead in the residue gas leaving the deethanizing absorber or in an undesirable increase of hydrogen sulfide in the absorption oil leaving said absorber. That is, too much reboiler heat in the deethanizing absorber causes an increase in propane-propylene in the residue gas leaving said absorber resulting in the loss of these valuable hydrocarbons; and too little reboiler heat causes an increase of $H_2S$ and light hydrocarbons, desirably to be in the said residue gas, to be charged to the deethanizer. The removal of the $H_2S$ and light hydrocarbons from the deethanizer causes the carrying out of valuable propane-propylene to the fuel gas, losing these valuable hydrocarbons. No satisfactory method has been found to control the reboiler heat to the deethanizing absorber. Thus, in cool weather with all intercoolers (not shown) in operation on the deethanizing absorber, nearly complete deethanizing can be obtained with little loss of propane-propylene with the residue gas from the deethanizing absorber. That is, in one actual operation, only 11 B./D. (of 18,000,000 s. c. f. charge containing 2700 B./D. propane-propylene) of propane-propylene were lost to the residue gas. However, at the same time, 292 B./D. were lost out of the deethanizer to fuel gas. Warm weather or less intercooling in the deethanizer absorber permits good deethanizing in the deethanizing absorber but results in considerable loss of propane-propylene in the residue gas. Thus, when high propane-propylene recovery is obtained in the deethanizing absorber, large quantities of propane-propylene are lost to fuel gas from the deethanizer. This loss from the deethanizer also depends on the deethanizer overhead condenser temperature; losses ranging from none at 80° F., 8.8 mol percent at 100° F., to 50 mol percent at 145° F. It is very difficult to obtain cooling water cold enough so that the deethanizer overhead condenser will operate as low as 100° F. Normally, the operations in the plant are at 130–135° F., causing up to 45 mol percent propane and propylene loss to fuel gas from the deethanizer. Even if cold cooling water is available, temperatures below about 100° F. are not practicable in the presence of $H_2S$ because of formation of hydrates.

It takes several hours for a change in the deethanizing efficiency of the deethanizing absorber to be noticed in the deethanizer, and the use of the fuel gas yield is not adequate for control of the deethanizing absorber.

One method of reducing the loss of $C_3$ hydrocarbons from the stream of gases desirable for other than fuel gas is to return the deethanizer overhead to the deethanizing absorber thus to recover the $C_3$ hydrocarbons in the absorption oil fed to said absorber. However, when the gases fed to the system contain, as they usually do, a large proportion of $H_2S$ (about 12 mol percent or more), there will result an increased amount of $H_2S$ in the deethanizing absorber reboiler. This is undesirable due to corrosive effects which occur in the reboiler. Therefore, in the actual operation of a plant as here described, practice has been to pass the deethanizer overhead stream to fuel gas, losing desirable propane and propylene.

It is an object of the present invention to recover valuable hydrocarbons from gases containing them. It is another object of the invention to recover from hydrocarbon gases containing them a residue gas containing $C_2$ and lighter hydrocarbons, a fuel gas also containing $C_2$ and lighter hydrocarbons, a stream containing $C_3$ hydrocarbons, a stream containing $C_4$ hydrocarbons, and a stream of a treating agent containing hydrogen sulfide removed from said hydrocarbon gases containing said hydrocarbons. It is a further object of the invention to recover a residue and/or a fuel gas of reduced hydrogen sulfide content from a stream of sour hydrocarbon gases. Other aspects, objects and several advantages of the invention are apparent from a study of this disclosure, the drawing and the appended claims.

The invention will now be set forth and specified more fully in connection with the drawing.

Referring now to the drawing which forms a part of the specific example of this specification and which for sake of simplicity is in diagrammatic form, the operation prior to application of the present invention will be described, its problems more fully pointed out and the application of the present invention to solve them set forth more fully and described in more detail.

In the prior practice, there have been employed a deethanizing absorber 10, a depropanizer 20 and a deethanizer 30. These pieces of equipment have been operated as follows. Absorber oil fed by way of pipe 12 to deethanizing absorber 10 therein absorbs from the gaseous hydrocarbon feed by way of pipe 11 substantially all hydrocarbons having 3 or more carbon atoms per molecule. Thus, there is produced overhead residue gas removed by way of pipe 13 containing ethane, methane and when the feed contains hydrogen it will also be included in the residue gas. The bottom portion of absorber 10 is reboiled by passing rich absorption oil by way of pipe 14, pipe 15, reboiler 16 and pipe 16a continuously through the described circuit. Heat is supplied to reboiler 16 in manner known to those skilled in the art. Quantities of rich absorption oil in excess of the level to be maintained in the foot of absorber 10 are passed by way of pipe 17 to depropanizer 20. This tower is operated to remove overhead, substantially all hydrocarbons containing 3 atoms of carbon or less in the molecule and to obtain as bottoms substantially only hydrocarbons containing at least 4 atoms of carbon in the molecule. The bottom of depropanizer 20 is reboiled by passing liquid from the bottom thereof by way of pipes 25 and 26, reboiler 27 and pipe 27a continuously through the described circuit. The conditions for operating this tower as well as other towers or parts of the system described in the drawing are given below. The $C_4$ hydrocarbons and absorption oil are removed from depropanizer 20 by way of pipe 28. These hydrocarbons can be recovered by methods known to one skilled in the art and the absorption oil returned to the system for reuse. The overhead taken from depropanizer 20 by pipe 18 is passed through condenser 19 and from condenser 19 to accumulator drum 21. A portion of the liquefied overhead is returned to depropanizer 20 as reflux therefor by way of pipe 22. By suitable liquid level control 24 operating upon valve 24a and pipes 23 and 23a, there is pumped by way of pump 23b to deethanizer 30, depropanizer 20 overhead. In deethanizer 30, this overhead is fractionated to obtain a bottoms removed by pipe 33 and pipe 36 containing substantially only $C_3$ hydrocarbons. Deethanizer bottoms are reboiled by continuously passing them by way of pipes 33 and 34, heater 35 and pipe 35a in closed circuit. The $C_3$ hydrocarbons are removed by way of pipe 36. The overhead from deethanizer 30, according to the practice prior to the present invention, will contain in addition to $C_2$ hydrocarbons propane and propylene which are lost to fuel gas. Thus, the overhead removed by way of pipe 29, condenser 30a, and passed to accumulator 31 is, in part, returned by way of the pump and pipe 32 as reflux for deethanizer 30 and, in part, removed by way of pipe 51 as fuel gas. The reason for losing propane and propylene by way of pipe 51, according to the earlier practice, is given herein and is not here repeated for sake of simplicity.

According to the invention, the possible trouble due to corrosion caused by high $H_2S$ content in the deethanizing absorber reboiler is avoided and substantial amounts of propane and propylene heretofore lost to fuel gas are recovered by adding, following the deethanizing step, a propane absorber as shown by 40 in the drawing. When propane absorber 40 is employed according to the invention, pipe 51 is blanked off and deethanizer 30 overhead is passed by way of pipe 37 into propane absorber 40. Absorption oil is passed into an upper portion of absorber 40 by way of pipe 50 and passes downwardly in countercurrent flow contact with the deethanizer overhead which is introduced to absorber 40 by way of pipe 37 at a lower portion of absorber 40. This results in production, very readily, of a fuel gas which is removed by way of pipe 38 on which a control valve, responsive to the pressure in the tower indicated by 39, is mounted. Liquid level controller 42 controls a bottom valve in line 41 which removes bottoms from propane absorber 40 to a water separation of hydrogen sulfide step. On its way to water separator 43, the propane absorber 40 bottoms, passing by way of pipe 41, are admixed with water injected into pipe 41 at 52. The water and absorption oil are intimately mixed but form two phases in separator 43. The top phase, which is the oil phase and which contains the propane and propylene, which is recovered according to the invention, is passed by way of pipe 46 to feed pipe 11 for return to deethanizing absorber 10. Alternative injection to deethanizing absorber 10 is shown by way of pipes 47 and 49 and pipes 47 and 48. The bottoms from water separator 43 contain hydrogen sulfide dissolved in water and are removed by way of valve 44. This hydrogen sulfide can be recovered or, as shown in the drawing, run to a sewer. An interface controller means 45 is shown wherewith to operate valve 44.

It will be noted that the absorption oil containing propane and propylene which is returned by way of pipe 46 contains a very low quantity of hydrogen sulfide. This avoids the problem encountered in the reboiling of demethanizing absorber bottoms in tower 10, when the deethanizer overhead gases are returned directly to the deethanizing absorber.

In the specific example being described, the absorption oil used in demethanizing absorber 10 and in propane absorber 40 is a straight run (400° F. E. P.). It will be understood that other absorption oils can be used.

The tabulated data show the advantages of the invention in the recovery of 20° B./D. propylene and 9 B./D. of propane presently lost from the system as residue and fuel gas. The propylene so saved charged to an alkylation operation represents an over $20,000 per year savings.

The following operating conditions are specific to the example of the drawing to the extent required by one skilled in the art to place into operation the herein described and claimed invention.

|  | ° F. Temperature, of— | | Pressure, p. s. i. g. |
| --- | --- | --- | --- |
|  | Top | Bottom |  |
| Operating Conditions for Invention: |  |  |  |
| Deethanizing Absorber (10) | 100 | 180 | 150 |
| Depropanizer (20) | 115 | 345 | 210 |
| Deethanizer (30) | 125 | 145 | 460 |
| Propane Absorber (40) | 130 | 150 | 450 |
| Operating Conditions Before Invention: |  |  |  |
| Deethanizing Absorber (10) | 100 | 200 | 150 |
| Depropanizer (20) | 115 | 345 | 210 |
| Deethanizer (30) | 125 | 145 | 460 |
| (No Propane Absorber) |  |  |  |

The following streams show the propylene and propane contents and total volumes of flow. The propane-propylene figures for the deethanizer bottoms (36) also include the amount which is recovered in the depropanizer bottoms.

The total charge of 18,000,000 S. C. F./D. is the same to each operation and contains $H_2$, $H_2S$, $C_1$'s through $C_4+$.

The balance is made with respect to propane and propylene with account taken of the $H_2S$ in certain pertinent streams.

| Stream | Before Invention | Invention |
|---|---|---|
| Charge (11): | | |
| S. C. F./D | 18,000,000 | 18,000,000 |
| Propylene, B./D | 1,600 | 1,600 |
| Propane, B./D | 1,100 | 1,100 |
| Residue Gas (13): | | |
| S. C. F./D | 6,000,000 | 5,893,000 |
| Propylene, B./D | 29 | 26 |
| Propane, B./D | 19 | 13 |
| Fuel Gas (51): | | |
| S. C. F./D | 165,000 | not yielded |
| $H_2S$, S. C. F./D | 20,000 | |
| Propylene, B./D | 34 | |
| Propane, B./D | 7 | |
| Rich Oil (46): | | |
| B./D., (less $C_2$'s) | not done | 670 |
| $H_2S$, B./D | | 2 |
| Propylene, B./D | | 71 |
| Propane, B./D | | 14 |
| Absorption Oil, B./D | | 583 |
| Absorption Oil (50) | not used | 583 |
| Absorption Oil (12) B./D | 13,000 | 13,000 |
| To Propane Absorber (37): | | |
| S. C. F./D | not used | 400,000 |
| $H_2S$, S. C. F./D | | 32,000 |
| Propylene, B./D | | 88 |
| Propane, B./D | | 18 |
| Deethanizing Bottoms (36): | | |
| Propylene, B./D | 1,537 | 1,557 |
| Propane, B./D | 1,074 | 1,083 |
| Fuel Gas (38): | | |
| S. C. F./D | not yielded | 200,000 |
| $H_2S$, S. C. F./D | | 19,000 |
| Propylene, B./D | | 17 |
| Propane, B./D | | 4 |

It is obvious from the foregoing description of the invention that the water or other treatment to remove $H_2S$ from the rich absorber oil obtained at the bottom of tower 40 might be practiced elsewhere in the method where $H_2S$ in the oil can be found. However, it is important as a feature of the invention that this $H_2S$ removal is practiced at the place indicated in the above description since it is here that a minimum of $H_2S$ needs to be removed by treatment. Furthermore, since a small stream is treated in absorber 40, only a relatively small amount of oil is here used and, therefore, treated in separator 43.

It is not always necessary to add water to the propane absorber section. That is, in many instances, charge material 37 is saturated with water vapor and this charged water, in part, is condensed in the propane absorber 40 to produce the $H_2S$-water stream which is removed from the bottom of tower 40 to a sour water stripper (not shown) or to the sewer. In those operations where insufficient water vapor is present in the feed 37, additional water can be added via line 52 and/or line 53. When it becomes necessary to add moisture to the propane absorption step, water is preferred over aqueous solutions of such as caustic, amines, etc.

Reasonable variation and modification are possible within the scope of the foregoing disclosure, drawing and the appended claims to the invention, the essence of which is that there has been provided, according to the present invention, a method for the recovery of valuable $C_3$ and $C_4$ hydrocarbons from a hydrocarbon gas stream containing the same and hydrogen sulfide which comprises in a deethanizing absorber contacting the said gases with an absorption oil under conditions to allow substantially no loss of propane-propylene in the residue gas emanating therefrom, then depropanizing the gases which have been absorbed, then deethanizing the gases obtained upon depropanizing and then, in a separate zone, again contacting gases obtained from said deethanizing with an absorption oil to obtain a fuel gas containing substantially no propane-propylene and an absorber oil containing propane-propylene, washing said absorption oil with a treating agent to remove hydrogen sulfide therefrom and returning said absorption oil and its contained propane-propylene to said deethanizing absorber for recovery therefrom of said propane-propylene.

I claim:

1. A method for recovering a gaseous hydrocarbon of reduced hydrogen sulfide content from a stream of hydrocarbons containing the same and hydrogen sulfide which comprises contacting said stream of hydrocarbons with an absorption medium in an absorption zone to absorb said hydrocarbon and hydrogen sulfide which is also unavoidably absorbed in said medium, then contacting the thus enriched medium with an agent which is not substantially miscible with said medium, said agent being adapted to remove hydrogen sulfide from said medium, and then separating said medium and said agent, and recovering said hydrocarbon having a reduced hydrogen sulfide content from said medium.

2. A method for recovering a $C_3$ hydrocarbon from a stream of hydrocarbon containing gases also containing hydrogen sulfide which comprises contacting said stream of hydrocarbons with an absorption oil in an absorption zone to absorb $C_3$ hydrocarbons and hydrogen sulfide in said oil, then contacting the thus enriched absorption oil with water under conditions to remove hydrogen sulfide from said oil into said water, and then separating said oil and said water, and recovering $C_3$ hydrocarbon from said oil.

3. A method for recovering valuable hydrocarbons and a fuel gas from a stream containing said hydrocarbons, fuel gas hydrocarbons and hydrogen sulfide which comprises in a first absorption zone contacting said stream with an absorption medium to absorb substantially all valuable hydrocarbons from said stream, resulting in a residue gas and a medium rich in valuable hydrocarbons and unavoidably absorbed hydrogen sulfide, removing from the rich medium substantially all $C_4$ and some $C_3$ hydrocarbons to obtain a second stream containing substantially all $C_2$ and lighter hydrocarbons, hydrogen sulfide and unavoidably $C_3$ hydrocarbons, subjecting said second stream to contact with absorption medium in a second absorption zone to absorb substantially all $C_3$ hydrocarbons and unavoidably hydrogen sulfide therefrom, resulting in a fuel gas, subjecting a second rich absorption medium thus obtained to treatment in a third zone with an agent which is not substantially miscible with said absorption medium said agent being adapted to remove hydrogen sulfide from said absorption medium, separating said medium and said agent, and cycling said absorption medium to a hydrocarbon removal step.

4. A method according to claim 3 wherein the hydrocarbon removal step is said first absorption zone.

5. A method according to claim 3 wherein said agent is water and the absorption medium in the second absorption zone is an absorption oil.

6. A method according to claim 5 wherein said absorption oil is a gasoline.

7. A method which comprises feeding to a deethanizer absorption zone a stream of hydrocarbon gases containing $C_1$—$C_4$ hydrocarbons and hydrogen sulfide, in said zone contacting said stream with an absorption oil under conditions to absorb into said oil substantially all of $C_3$ and heavier hydrocarbons and unavoidably hydrogen sulfide, in a depropanizer zone removing $C_3$ hydrocarbons, lighter hydrocarbon and hydrogen sulfide from said oil, leaving $C_4$ hydrocarbons in said oil, in a deethanizer zone separating, from said $C_3$ hydrocarbons, lighter hydrocarbons and hydrogen sulfide which have been removed from said oil, a stream containing only $C_3$ hydrocarbons, resulting in a residual stream unavoidably containing desirable $C_3$ hydrocarbons, lighter hydrocarbons and hydrogen sulfide, contacting said last-mentioned stream with an absorption oil so as to absorb substantially all desirable $C_3$ hydrocarbons therefrom, then treating the last-mentioned oil with water to wash hydrogen sulfide therefrom, and then passing said washed oil containing said $C_3$ hydrocarbons to said deethanizer absorber zone.

8. A method according to claim 7 wherein the absorption oils are each of them a gasoline fraction.

9. A method for recovering a gaseous hydrocarbon of reduced hydrogen sulfide content from a stream containing hydrocarbon, hydrogen sulfide and water vapor which comprises contacting said stream with an absorption medium consisting essentially of a water immiscible absorption oil in an absorption zone to absorb said hydrocarbon and hydrogen sulfide which is also unavoidably absorbed in said oil medium and under conditions forming an aqueous phase, and separating an aqueous phase from the enriched oil medium, thus removing a substantial proportion of hydrogen sulfide from said stream and recovering said hydrocarbon having a reduced hydrogen sulfide content from said medium.

References Cited in the file of this patent

UNITED STATES PATENTS

| | | |
|---|---|---|
| 2,388,732 | Finsterbusch | Nov. 13, 1945 |
| 2,437,288 | Anderson | Mar. 9, 1948 |
| 2,500,353 | Kantt | Mar. 14, 1950 |
| 2,780,580 | Kniel | Feb. 5, 1957 |